(12) United States Patent
Marek et al.

(10) Patent No.: US 7,734,933 B1
(45) Date of Patent: Jun. 8, 2010

(54) SYSTEM FOR PROVIDING SECURE AND TRUSTED COMPUTING ENVIRONMENTS THROUGH A SECURE COMPUTING MODULE

(75) Inventors: James A. Marek, Anamosa, IA (US); David S. Hardin, Cedar Rapids, IA (US); Raymond A. Kamin, III, Robins, IA (US); Steven E. Koenck, Cedar Rapids, IA (US); Allen P. Mass, Lisbon, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1391 days.

(21) Appl. No.: 11/156,244

(22) Filed: Jun. 17, 2005

(51) Int. Cl.
*G06F 11/30* (2006.01)
(52) U.S. Cl. .................. 713/193; 711/173; 713/164
(58) Field of Classification Search ............... 713/193, 713/164; 726/2, 17
See application file for complete search history.

(56) References Cited

U.S. PATENT DOCUMENTS 6,836,548 B1 * 12/2004 Anderson et al. ............ 380/28
7,194,623 B1 * 3/2007 Proudler et al. ............. 713/164
2004/0044902 A1 * 3/2004 Luthi ........................ 713/200
2005/0246521 A1 * 11/2005 Bade et al. ................. 713/150

OTHER PUBLICATIONS

Alves-Foss et al., "A Multi-Layered Approach to Security in High Assurance Systems" IEEE, 2004, pp. 1-10.*

* cited by examiner

*Primary Examiner*—Jung Kim
*Assistant Examiner*—Samson B Lemma
(74) *Attorney, Agent, or Firm*—Matthew J. Evans; Daniel M. Barbieri

(57) ABSTRACT

The present invention is directed to a system for providing a trusted environment for untrusted computing systems. The system may include a HAC subsystem managing shared resources and a trusted bus switch for controlling a COTS processor to access the shared resources. The shared resources such as memory and several I/O resources reside on the trusted side of the trusted bus switch. Alternatively, the system may include a SCM as an add-on module to an untrusted host environment. Only authenticated applications including COTS OS execute on the SCM while untrusted applications execute on the untrusted host environment. The SCM may control secure resource access from the untrusted host through a plug-in module interface. All secure resources may be maintained on the trusted side of the plug-in module interface.

38 Claims, 18 Drawing Sheets

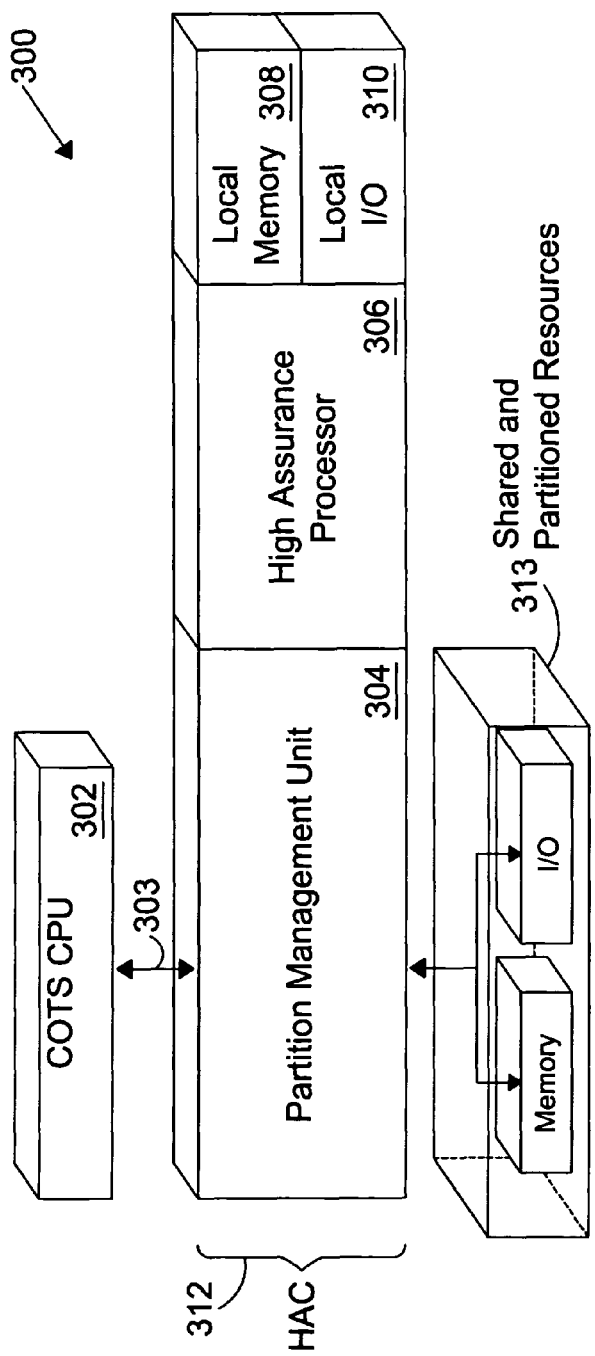
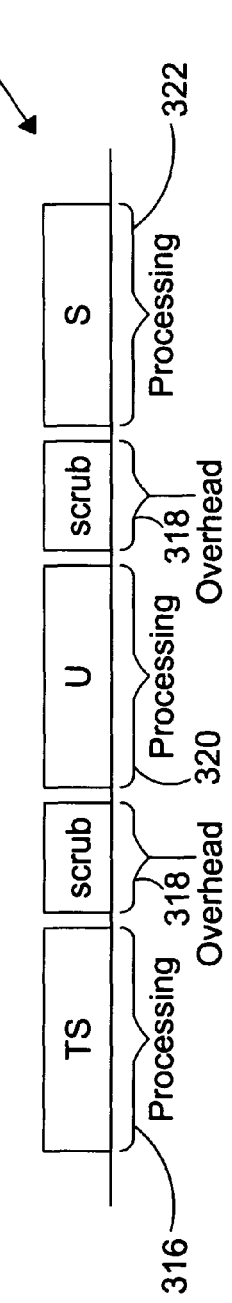
FIG. 3A
FIG. 3B

SYSTEM FOR PROVIDING SECURE AND TRUSTED COMPUTING ENVIRONMENTS THROUGH A SECURE COMPUTING MODULE

FIELD OF THE INVENTION

This invention relates generally to computing environments and more particularly to a system for providing a secure and trusted commercial-off-the-shelf COTS computing environment.

BACKGROUND OF THE INVENTION

A secure communication system for military applications is required to have high bandwidth and support users who operate at different security levels. The levels of security depend on the type of information being communicated and upon the parties involved in the communication. For example, a network connecting real time embedded military multi-level applications must support communications between diverse groups with different clearance levels. In order to support such a network at a reasonable cost, it is desirable to utilize commercial-off-the-shelf (COTS) network technologies and standards as much as possible. However, most COTS network components do not meet the level of security to meet information assurance requirements for the secure communication system including military multi-level applications.

Government and military applications often require more stringent standards for components. For example, security standards for computer and communication equipment for military applications are typically more stringent than security standards of comparable commercial computer and communication equipment. In the past, specialized components were employed which could meet the stringent standards of military applications. A drawback associated with the specialized components is the high cost associated with the design and manufacture of a specialized component with limited market potential outside of military applications.

Consequently, a system suitable for highly assured military applications employing widely available and cost effective commercial off-the-shelf (COTS) components is necessary.

SUMMARY OF THE INVENTION

Accordingly, the present invention is directed to a system for providing a trusted COTS computing environment.

In an exemplary aspect of the present invention, a system provides a secure COTS computing environment through controlling COTS processor resource access. The system may implement an inter-partition separation without needing to modify COTS processors or COTS operating systems.

The system includes a trusted bus switch and a High Assurance Controller (HAC) subsystem. The trusted bus switch may control the COTS processors to access shared resources. The shared resources such as memory and several I/O resources reside on the trusted side of the trusted bus switch. The memory and several I/O resources may be managed by the HAC subsystem.

The HAC subsystem may be configured to ensure that each COTS processor based application has access only to a corresponding memory partition. The HAC subsystem may enforce timesharing among COTS processor based applications. The HAC subsystem may include a local memory, a partition management unit (PMU), and a High Assurance Microprocessor. The High Assurance Microprocessor may implement intrinsic partitioning. The PMU may be configured to enforce access to shared resources so that the COTS CPU only accesses its predetermined partitions for a certain computing function.

In an additional exemplary aspect of the present invention, a system including a Secure Computing Module (SCM) provides a trusted environment for COTS host platforms. Only authenticated trusted applications execute on the SCM while untrusted applications execute on the untrusted host environment. The SCM may control secure resource access from an untrusted host through a plug-in module interface. All secure resources may be maintained on the trusted side of the plug-in module interface. Untrusted host access to the SCM is subject to a stringent authentication protocol.

The SCM may include two subsystems: an authenticated subsystem (ACE) and a trusted manager subsystem (TSM) residing on the trusted environment. The ACE may be secured by authenticating all code and data used for running COTS applications. The ACE may include an embedded COTS OS and various COTS applications. The ACE may be cleansed and encrypted and then stored on a local encrypted storage. The stored ACE on the local encrypted storage may be decrypted and loaded with the TSM during the SCM installation.

The TSM may be suitable for providing partitioning for both memory and I/O resources on the trusted environment. All I/O paths of the SCM are configured to go through the TSM. Each I/O path is managed by a dedicated secure TSM partition and subject to authentication protocols. The TSM may include a trusted processor for providing a brick-wall partitioning environment and a cryptographic engine for providing a robust security interface in a secure communication network.

Advantageously, the system including the SCM may provide trusted and portable COTS computing environments against malware. Use of the ACE in conjunction with the TSM may ensure COTS applications running on the SCM to be free from malware and manufacturer-supplied software to be trusted. Only authenticated applications including COTS OS execute on the SCM while untrusted applications execute on the untrusted host environment. The SCM may control secure resource access from the untrusted host through a plug-in module interface. All secure resources may be maintained on the trusted side of the plug-in module interface.

In another additional aspect of the present invention, the SCM may utilize input and output devices of the untrusted host as virtual Input and output devices for the secure COTS environment. The SCM may include a Trusted Agent configured to be loaded onto the untrusted host from the SCM in "Plug-and-Play" fashion when the SCM is added on to the untrusted host. The Trusted Agent may reside on the untrusted host environment while the SCM is implemented. The Trusted Agent in conjunction with the TSM creates a secure I/O path from/to input and output devices of the untrusted host. In this manner, the input and output devices of the untrusted host may be implemented as virtual Input and output devices for the SCM.

In a further aspect of the present invention, the SCM may provide secure COTS environments for various host COTS platforms. The SCM may use a Compact Flash (CF) interface for a PDA host. The SCM may be connected as a USB, CF, or PCMCIA device for a laptop host. The SCM may use a USB connection for a desktop PC host.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

Those numerous objects and advantages of the present invention may be better understood by those skilled in the art by reference to the accompanying figures in which:

FIG. 3A illustrates a block diagram of a secure COTS computing environment with a single processor in accordance with an exemplary embodiment of the present invention;

FIG. 3B illustrates a processing timing of the secure COTS computing environment shown in FIG. 3A;

DETAILED DESCRIPTION OF THE INVENTION

Reference will now be made in detail to presently preferred embodiments of the invention, examples of which are illustrated in the accompanying drawings.

The present invention discloses a system for providing a secure COTS computing environment based on embedded security architecture.

1. Secure COTS Computing Environment Through HAC

A secure COTS computing environment is provided by a system including a High Assurance Controller (HAC) subsystem to control execution of COTS functions and enforce security partitioning for applications running on the untrusted COTS processor. A COTS processor resource access may be controlled through a trusted bus switch with all memory and shared I/O resources residing on a trusted side of the trusted bus switch. The HAC subsystem is suitable for controlling the trusted bus switch and executing multiple partitions with guaranteed separation. The HAC subsystem may maintain high Evaluation of Assurance Level (EAL) certifications such as EAL-6 and EAL-7 according to NSA common criteria of security characterizations. The system may support an inter-partition separation without needing to modify the COTS processor or COTS operating system. The intrinsic partitioning separation is independent of the security pedigree of both the COTS operating system and the host applications.

1.1 Secure Computing Environment

Figure 1:
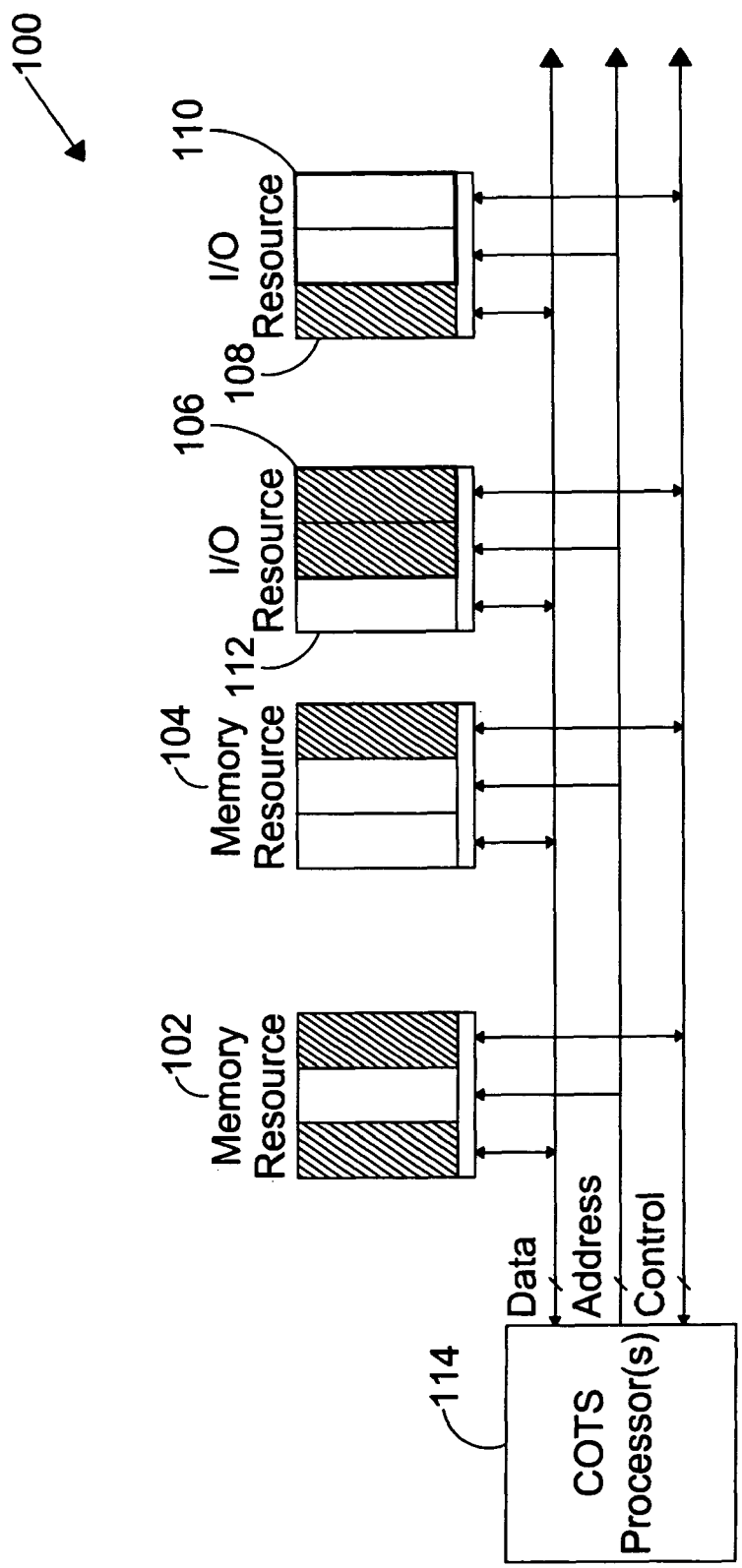
FIG. 1 illustrates a block diagram of a prior art secure computing environment.

Referring now to FIG. 1, a block diagram of a conventional secure computing environment 100 is shown. In a conventional computing environment, COTS processors 114 communicate directly with memory 102, 104 and I/O resources 106, 108, 110, 112 using data, address, and control bus structures. In order to maintain a secure computing environment, access to certain shared resources such as memory 102, 104 and the like, or parts of the shared resources such as shared I/O devices 106, 108 are controlled in a structured manner to prevent compromising classified data. There have been efforts to control shared resources without compromising classified data. For example, a separation kernel in a Multiple Independent Level of Security (MILS)-compliant real time OS has been utilized to prevent compromising classified data. However, the operation level separation may result in a complicated separation mechanism requiring the myriad implementation details to be verified to ensure security of the system.

Figure 2:
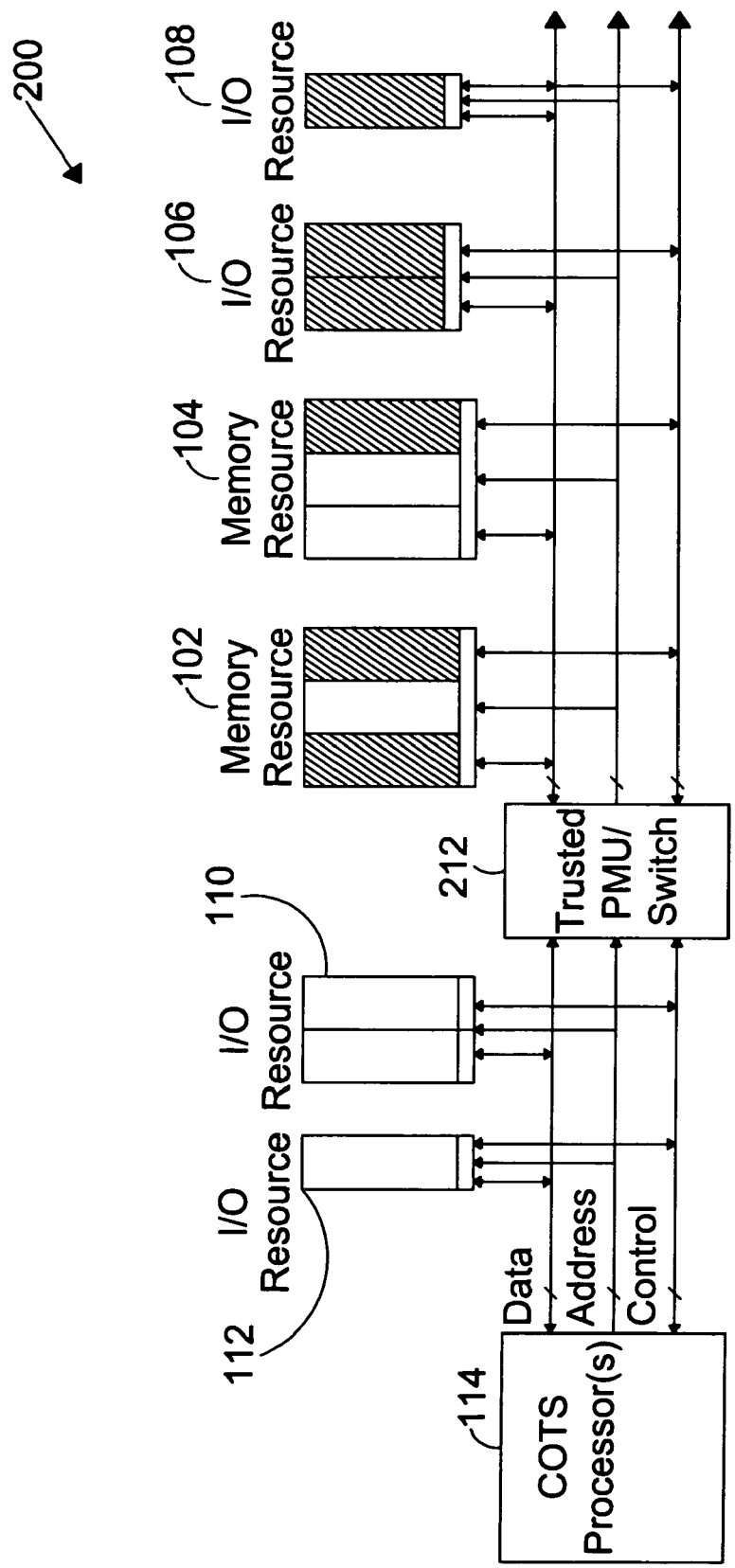
FIG. 2 illustrates a block diagram of a secure computing environment utilizing a trusted bus switch in accordance with an exemplary embodiment of the present invention.

As shown in FIG. 2, in an embodiment of the present invention, resource access by COTS processors 114 is controlled through a trusted bus switch 212, where all memory 102, 104 and several shared I/O resources 106, 108 are moved to the trusted side of the trusted bus switch 212. The COTS processors 114 may be capable of accessing local I/O resources 110, 112 without requiring any access control by the trusted bus switch. The local I/O resources 110, 112 not requiring access controls reside on the untrusted side of the trusted bus switch. The trusted bus switch may be managed by a HAC subsystem to enforce an arbitrary security policy.

1.2 HAC Subsystem

Referring now to FIG. 3A, a block diagram of a secure COTS computing environment 300 having a single processor is shown. In an embodiment of the present invention, the secure computing environment 300 may include a HAC subsystem 312, a COTS Central Processing Unit (CPU) 302, and various shared and/or partitioned resources 313. The HAC subsystem 312 is responsible for control of COTS CPU execution as well as enforcing access to shared resources 313 such as memory and I/O. The HAC subsystem 312 may monitor and manage partitions for the COTS CPU. The HAC subsystem 312 is responsible for zeroizing, loading, configuring, and controlling the COTS CPU for time-sliced real time execution of Multiple Independent Level of Security (MILS) computing functions. Zeroizing the COTS CPU may include approved zeroization procedures configured to erase sensitive information (e.g. keys for a cryptographic module) or decrypted secure data to prevent its disclosure. The HAC subsystem 312 is also responsible for user authentication. The HAC subsystem 312 is a complete computing environment including local memory 308 coupled to a local I/O 310, a partition management unit (PMU) 304, and a high assurance processor 306.

The PMU 304 may enforce access to shared and partitioned resources 313 so that the COTS CPU 302 is prevented from accessing outside its predetermined resource partitions. The COTS CPU 302 is interfaced to the PMU through its local memory bus 303 and accesses its corresponding memory partitions through the PMU. The corresponding memory partitions are predetermined by the HAC subsystem 312. In a particular embodiment, a ROCKWELL COLLINS AAMP7™ microprocessor may be used as the high assurance processor. The AAMP7™ microprocessor provides brick-wall partitioning and has been formally verified as part of an NSA certification effort.

In a preferred embodiment of the present invention, the HAC subsystem 312 may be suitable for implementing intrinsic partitioning with brick-wall separation. Partitions are processing contexts where communication between partitions is limited to what is allowed by an information flow policy.

Generally, a system has intrinsic partitioning when the underlying processing platform of the system is designed to enforce brick-wall separation. Such intrinsic partitioning may provide concrete assurance of the spatial and temporal separation between partitions. The underlying processing platform enforces a policy of information flow between partitions with mechanisms that are designed into the machine itself, not added later at the operating system or application levels. To ensure that highly sensitive data is securely mixed with data and programs at lower or unclassified levels requires a separation mechanism that is best implemented and certified at a low level of the design.

Utilizing the Intrinsic partitioning approach, the HAC subsystem 312 may provide a separation mechanism that is independent of the security pedigree of both the operating system and the hosted applications. The relative simplicity of the approach allows for high levels of assurance and allows the system developer to choose an operating system, such as Portable Operating System Interface (POSIX,) VxWorks, and the like, best suited for personality modules such as Global Positioning System (GPS) user devices, Joint Tactical Radio Systems (JTRS), PDAs, cell phones, and the like.

As shown in FIG. 3B, the HAC subsystem 312 may enforce timesharing among applications running on the COTS CPU 302. The COTS CPU 302 executes a single computing function at a selected security level (e.g. Top Secret (TS), Secret (S), Unclassified (U) and the like) in each predetermined time slice 316, 320, 322. Access to shared resources for each time slice 316, 320, 322 is enforced by the PMU 304. Between computing time slices, there is an overhead time 318 caused by inter-time slice scrubbing. The HAC subsystem scrubs the previous processing partition by causing the COTS CPU to save its current state, zeroize its internal state, load the previously saved state for the impending time slice, and reestablish the PMU state.

As a result, the COTS CPU is ready to execute a next scheduled computing function. For example, a first computing function at TS security level may be executed in a first time slice 316. Before a second computing function at security level being executed in a second time slice 320, a processing partition for the first computing function may be "scrubbed" by the HAC subsystem 312. The HAC subsystem 312 causes the COTS CPU to zeroize its internal states and reestablish the PMU state. Then, the COTS CPU 302 is ready for executing the second computing function in the second time slice 320.

Figure 4A:
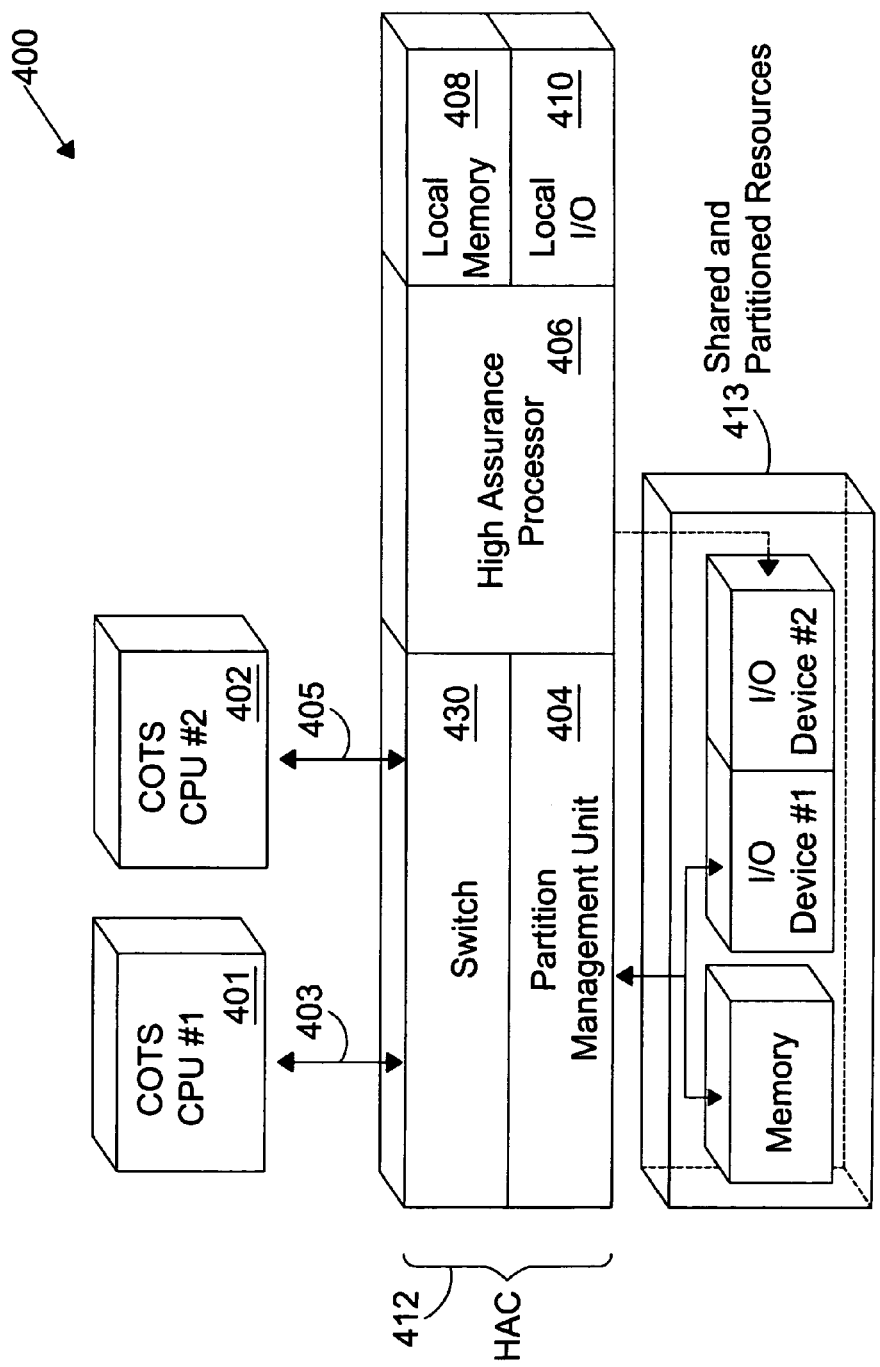
FIG. 4A illustrates a block diagram of a secure COTS computing environment with two processors in accordance with an exemplary embodiment of the present invention.

In an embodiment of the present invention, at least two COTS processors may be utilized to minimize inter-time slice scrubbing. Each inter-time slice scrubbing may be an overhead for the COTS processors. Referring now to FIG. 4A, a block diagram of a secure COTS computing environment 400 with a dual COTS CPU architecture is shown. The dual COTS CPU architecture is similar to the single processor version as shown in FIG. 3 except that a first COTS CPU 401 may be zeroized and prepared for the next time slice while the current time slice is executing on a second COTS CPU 402. Each COTS CPU 401, 402 is suitable for executing a computing function at a different security level. Each COTS CPU 401, 402 is coupled to a corresponding local bus 403, 405. The local buses 403, 405 are coupled to a switch 430 included in the HAC subsystem. The switch 430 may perform a source selection function so that access to shared memory is blocked for the non-selected COTS CPU, and is passed through with zero overhead to the selected COTS CPU.

Figure 4B:
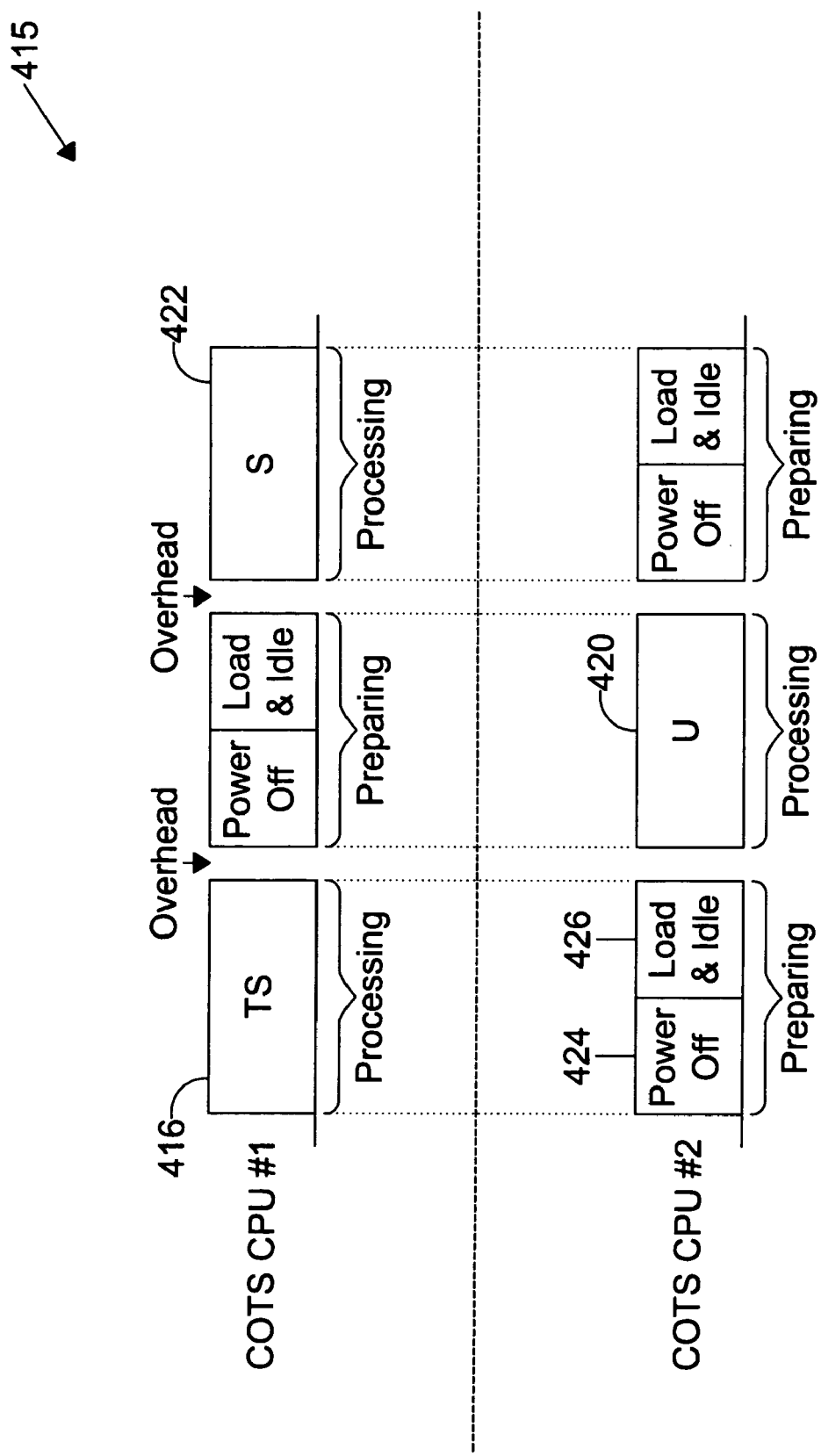
FIG. 4B illustrates a dual processing timing of the secure COTS computing environment shown in FIG. 4A.

FIG. 4B illustrates a dual processing timing 415 of the secure COTS computing environment with the dual COTS CPU architecture shown in FIG. 4A. The first COTS CPU executes a computing function in a time slice 416 while the second COTS CPU is being zeroized and prepared to execute a next scheduled computing function in a next time slice 420. After the second COTS CPU is zeroized, the second COTS CPU is loaded with the state that was saved from the previous execution of the scheduled time slice and then placed into an idle mode to conserve power. For example, the first COTS CPU executes a computing function at TS security level in a first time slice 416. During the first time slice 416, the second COTS CPU is zeroized and prepared to execute a computing function at U security level in a second time slice 420. Then, the second COTS CPU is placed into idle mode 426. In an embodiment, the second COTS CPU may be placed into power-off mode 424 for being zeroized. In this manner, the system may minimize overhead and maximize computing capacity with minimal power consumption penalty. (There is minimal time when the two processors are running simultaneously.)

Figure 5:
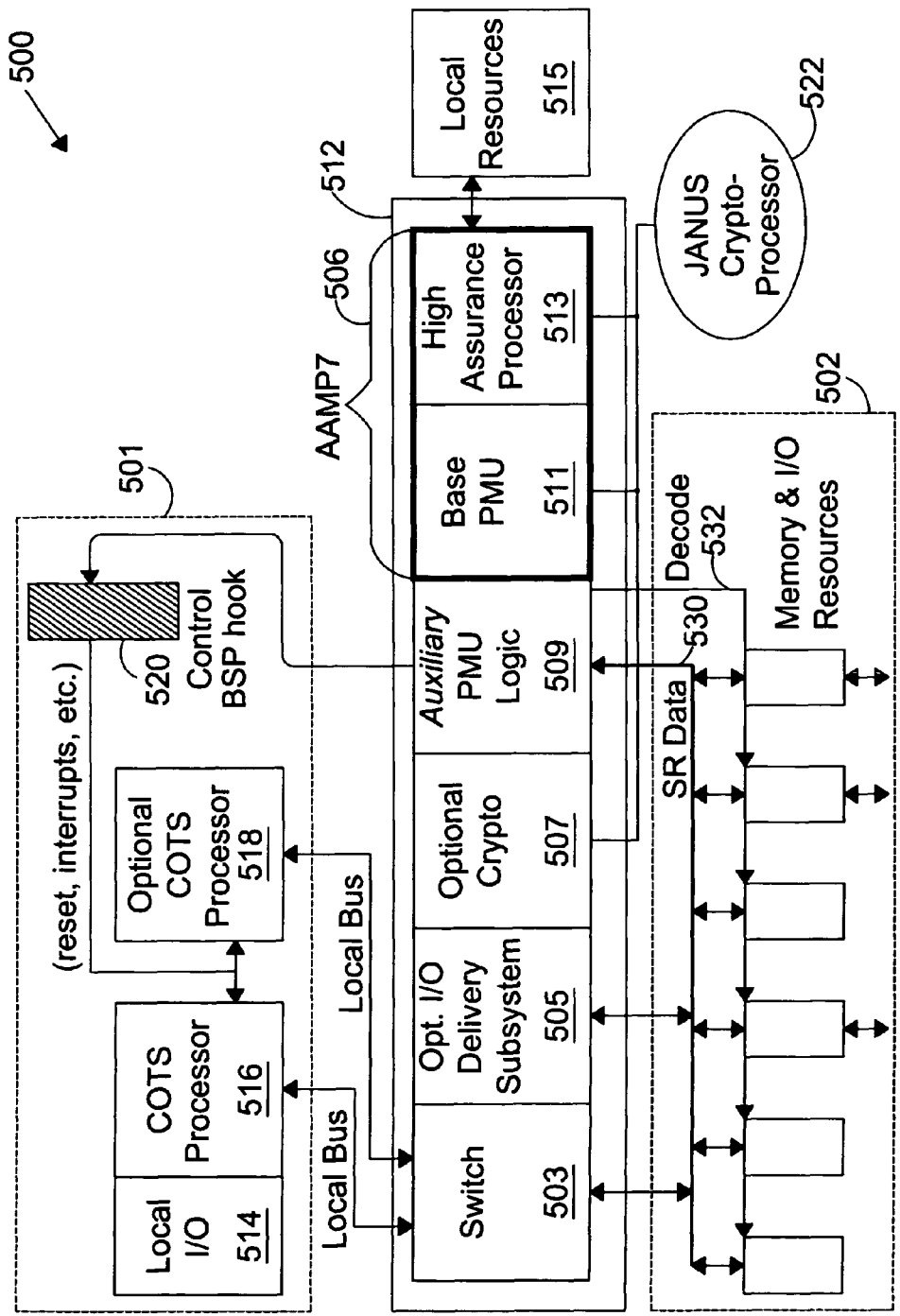
FIG. 5 illustrates a block diagram of a High Assurance Controller in accordance with an exemplary embodiment of the present invention.

Referring now to FIG. 5, a block diagram of a trusted environment 500 employing a HAC subsystem is shown. In an embodiment of the present invention, the HAC subsystem 512 may be suitable for being a trusted subsystem between the COTS world 501 and shared resources 502. In a particular embodiment, a High Assurance processor 506 such as AAMP7 may be suitable for providing Partition Management functions. In the particular embodiment, the HAC subsystem 512 may include auxiliary PMU logic for COTS processor and resource control.

A shared resource data path 530 may be included between the auxiliary PMU logic and shared resources 502. The shared resource (SR) data path 530 may be utilized for shared resource control and configuration related to COTS partition management. Additionally, the SR data path 530 may be utilized as part of a trusted I/O delivery subsystem operating on behalf of a COTS client. The I/O delivery system may be a buffered conduit between the COTS processor(s) and shared resources. When the SR data path 530 is utilized as described, the HAC subsystem 512 may be suitable for pre- or post-process data flowing to and from the COTS processor(s). The SR data path 530 may be utilized as the local bus for a trusted computing environment consisting solely of the HAC subsystem 512 and both its local and shared resources. In an embodiment of the present invention, the HAC subsystem 512 with the SR data path 530 may be suitable for supporting an autonomous secure computing environment. In another embodiment of the present invention, the HAC subsystem 512 may allow convenient implementation of critical security policies such as key management and biometrics support. A decode path 532 may be included between the auxiliary PMU logic and shared resources recognizing special separation requirements that may be imposed by smart I/O devices. (such as biometrics devices). Further, a Red/Black security separation for a secure communication network may be provided by adding an optional cryptographic engine 507.

In the secure communication network, users are not able to access sensitive information for which they are not authorized. In order to maintain such confidentiality, the network may be divided into a domain for processing possibly sensitive plain-text data, called the Red Domain, and a domain for processing non-sensitive and encrypted sensitive data, called the Black Domain. There may be multiple Red Domains in the network since each domain can be accredited to a different security (sensitivity) level. Users residing in the Red Domain are trusted to protect the information they process to a degree appropriate for the security classification of the data. Users residing in the Black Domain interface to the Red Domain through a cryptographic engine. In this manner, the Red/Black security separation may be provided by the cryptographic engine.

In a particular embodiment, the PMU, the high assurance processor, and the optional cryptographic engine 507 may be implemented with one component. For example, a ROCKWELL COLLINS Janus crypto-processor 522 includes AAMP7™ microprocessor, a cryptographic engine, and a base PMU. In addition, the switch, the I/O delivery subsystem, and the auxiliary PMU logic may initially be implemented in a Field-Programmable Gate Array (FPGA).

A board support package (BSP) is typically provided by the board designer/manufacturer for the COTS CPUs to interface with hardware. A small code segment (BSP hook) 520 residing in the BSP embedded within COTS OS may be interfaced between the HAC subsystem 512 and COTS CPUs 516, 518 to control COTS CPUs 516, 518.

Figure 6:
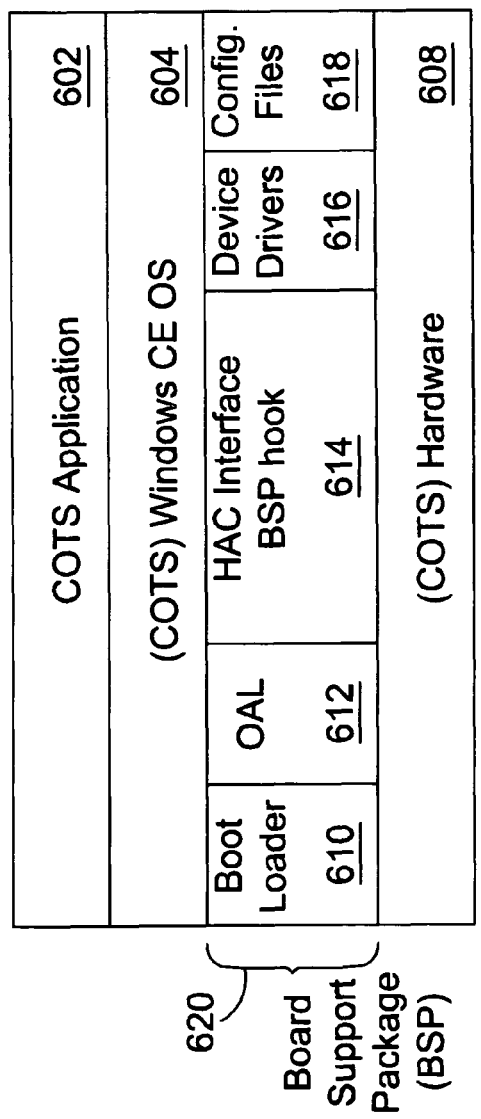
FIG. 6 illustrates a block diagram of a COTS operating system interface to the High Assurance Controller in accordance with an exemplary embodiment of the present invention.

As shown in FIG. 6, in an embodiment of the present inventions, Windows CE operating system may be utilized as an embedded COTS OS on the untrusted host platform. For instance, ruggedized PDAs may employ Windows CE operating system for COTS OS 604. The board designer/manufacturer of the COTS CPU for the ruggedized PDAs may provide the board support package (BSP) 620 including a boot loader 610, device drivers 616, configuration files 618, OEM Adaptation Layer (OAL) 612, and a HAC interface 614. A small, trusted fraction of the BSP code (BSP hook) may be used as part of the HAC interface 614. As such, modification of existing COTS environment may be minimal when the HAC subsystem is utilized to provide a secure COTS environment. The BSP hook 614 may be used as an interface to the HAC subsystem, being suitable for serving as the HAC subsystem's inside COTS proxy. It is to be noted that the BSP 620 may be provided for any custom hardware platform 608.

The present invention may provide numerous advantages. The system including the HAC subsystem may support multiple safety-critical embedded applications certified to different safety levels in a hard real-time environment. In this manner, certification costs for integrated applications of differing levels of criticality may be reduced and applications in different partitions may be certified to a level proportional to their criticality.

In addition, the present invention may allow the partitioning kernel model to run on the High Assurance processor's micro-architecture. Assertions concerning the kernel relative to the state of the underlying hardware may be proved to high levels of assurance. As such, building the separation kernel into a High Assurance processor's micro-architecture provides an extra level of assurance. Since the separation kernel is in hardware and microcode, the HAC subsystem may handle partition management duties at a relatively slow clock rate. The HAC subsystem, along with its local resources and those shared by the COTS processor(s), may serve as an independent, trusted subsystem capable of performing critical security functions such as key management and biometrics support.

Further, the system including the HAC subsystem may provide a secure COTS computing environment for various platforms for personality modules such as GPS user devices, JTRS, PDAs, Cell phones, and the like. The system may be personalized with various types of plug-in modules suitable for each platform. In a particular embodiment, depending on bandwidth requirements, information exchange with the personality modules may be accomplished with a simple, low pin count serial interface.

2. Secure COTS Computing Environment Through Secure Computing Module

A Secure COTS computing environment may be provided by a system including a SCM as an add-on module to an untrusted host environment. Only authenticated COTS applications and COTS OS execute on the SCM while untrusted applications execute on the untrusted host environment. The SCM may control secure resource access from the untrusted host through a plug-in module interface. All secure resources may be maintained on the trusted side of the plug-in module interface. Untrusted host access to the SCM is subject to a stringent authentication protocol. The system may ensure no vestige of decrypted secure data to remain on the COTS host through auto-zeroization capability. The system may provide secure wired and/or wireless network connections, with all network accesses requiring authentication.

Figure 7:
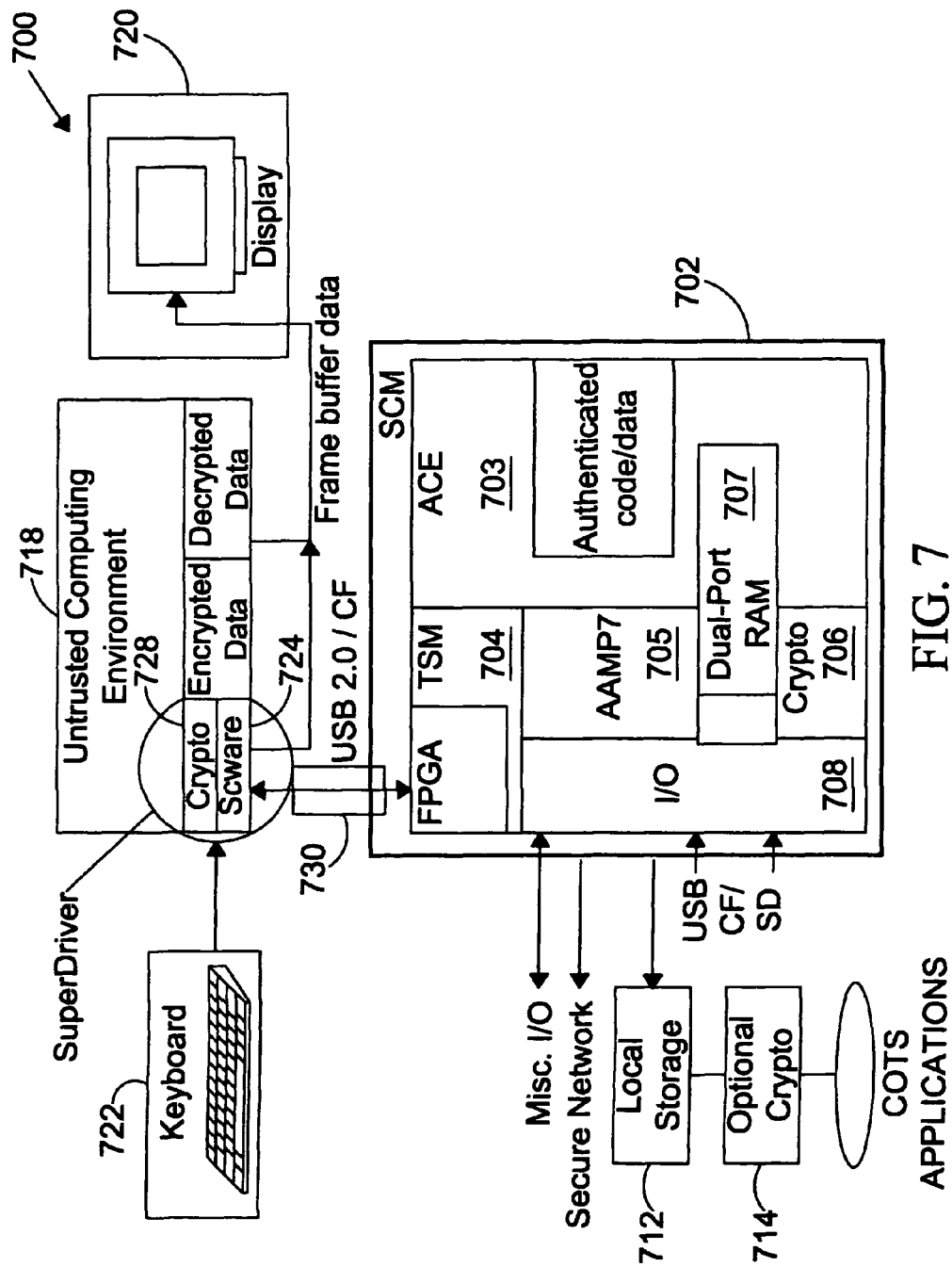
FIG. 7 illustrates a block diagram of a computing environment implementing SCM architecture in accordance with an exemplary embodiment of the present invention.

Referring now to FIG. 7, a block diagram of a computing environment 700 implementing SCM architecture in accordance with an exemplary embodiment of the present invention is shown. The SCM 702 may include a first subsystem 703 and a second subsystem 704 residing on the trusted environment. The untrusted host environment may include commercial software environments and applications, having minimal or no Common Criteria (CC) certification and no assurance of isolation between tasks. Conventionally, a host platform employing COTS processors is assumed to be untrusted. The trusted environment may include trusted hardware and software ensuring access to certain resources, or parts of shared resources to be controlled in a structured manner to prevent compromising classified data. The first subsystem 703 may be an Authenticated COTS environment subsystem (ACE) and the second subsystem 704 may be a Trusted Security Manager subsystem (TSM) 704.

2.1 Authenticated COTS Environment Subsystem (ACE)

The ACE 703 of the SCM 702 may be secured by authenticating all code and data used for running COTS applications. The ACE 703 includes an embedded COTS OS running on a compatible embedded COTS processor. Examples of the embedded COTS OS include WINDOWS® CE, LINUX, or PALM OS®, or the like. Examples of the embedded COTS processor may include an INTEL® cellular processor such as PXA270™ processors, mobile PENTIUM™ processors, TRANSMETA™ EFFICEON™ processors, and the like. It is to be noted that choice of OS and processor affects the size and power footprint of the SCM 702 and various COTS applications. The ACE 703 may include COTS applications, manufacturer-supplied software and the like. The ACE 703 including COTS applications, manufacturer-supplied software and associated data may be cleansed, optionally encrypted and then stored on a local storage 712. In an alternative embodiment, the local storage 712 may be communicatively coupled to an optional cryptographic engine 714. It is understood that there are various ways to authenticate applications and software without departing from the scope and spirit of the invention. The stored ACE is decrypted if the stored ACE have been encrypted and loaded with the TSM 704 from the local encrypted or unencrypted storage 712 as part of the SCM installation procedure. The loaded image of ACE may be verified by the TSM 704 utilizing memory verification methods such as a secure hash and/or cyclic redundancy check (CRC).

2.2 Trusted Security Manager

The TSM 704 may include a trusted processor 705 for providing a brick-wall partitioning of memory, time, and device resources, and enforcing predetermined security policies. The brick-wall partitioning of memory, time and device resources may ensure that applications execute in an environment that is strictly partitioned, highly protected and completely isolated from other applications. The TSM 704 also includes a local encrypted storage, a cryptographic engine 706, and multiple I/O channels for all I/O paths to the SCM 702. The cryptographic engine 706 may aid the trusted processor 705 to provide a robust security interface. The cryptographic engine 706 may include a reprogrammable cryptographic engine. Conventionally, cryptography is the widely used means for protecting information confidentiality and integrity. The use of cryptography allows much of the secure communication system to be built with COTS network components (NICs, switches, routers, firewalls or the like).

Memory and I/O resources in the SCM 702 are strictly partitioned and managed by several secure TSM partitions. Each I/O path of the SCM 702 is configured to go through the TSM 704 so that a corresponding TSM partition of an I/O path controls the I/O path to be secured and authenticated. Examples of I/O paths of the SCM 702 include I/O paths between the untrusted host and the SCM, I/O paths between a secure network and the SCM, I/O paths between a local storage and the SCM, and the like. The trusted processor is configured to provide a brick wall-partitioning environment of the TSM 704 via an intrinsic partitioning. A dedicated secure TSM partition may manage each I/O path being subject to authentication protocols.

It is contemplated that the TSM 704 is configured to ensure the ACE 703 to be incorruptible. All ACE I/O's are controlled by the TSM 704 and any I/O from/to the ACE 703 is configured to go through the TSM 704. In this manner, the ACE 703 is prevented from being compromised by unauthenticated code and data. I/O paths between the TSM 704 and the ACE 703 may include virtual I/O paths. In an embodiment, the virtual I/O paths between the TSM and the ACE may be implemented through a dual port RAM 707, with each I/O path and a memory-mapped resource being controlled by a dedicated TSM partition. As described above, The ACE 703 is loaded from the local storage (e.g. SD card, and the like) 712 during the SCM initialization phase. After the ACE 703 is loaded, the TSM 704 verifies the loaded image of ACE through memory verification methods. In an alternative embodiment, selected applications may be ported to the TSM 704 and run independently of the ACE 703 and the untrusted host.

In a particular embodiment of the present invention, the trusted processor 705 may include ROCKWELL COLLINS AAMP7™ microprocessor and the like. AAMP7 microprocessor is configured to manage the untrusted host and ACE interfaces through predetermined security policies. AAMP7 microprocessor is configured to provide intrinsic partitioning, which allows the integration of multiple applications in a way that allows for their assured separation. As discussed above, the intrinsic partitioning mechanism operates much like a separation kernel implemented in microcode. Rather than manage operating system tasks, however, the intrinsic partitioning mechanism maintains appropriate separation between a set of system partitions implemented directly in the microarchitecture and associated microcode. Further, AAMP7 may enforce a communication policy between partitions that ensures that improper communication is not allowed, thereby providing the system designer a useful and dependable building block for designing and implementing secure systems.

The cryptographic engine 706 of the SCM 702 may include ROCKWELL COLLINS Janus Crypto Engine, and the like. In the embodiment, AAMP7 microprocessor provides a robust security interface between the red domain and the black domain through Janus Crypto Engine. In the embodiment, I/O paths 730 between the untrusted host and the SCM 702 are managed by a low power Field-Programmable Gate Array (FPGA) and a dedicated TSM partition, allowing for any number of strict authentication protocols.

2.3 Trusted Agent-Scware

Figure 8:
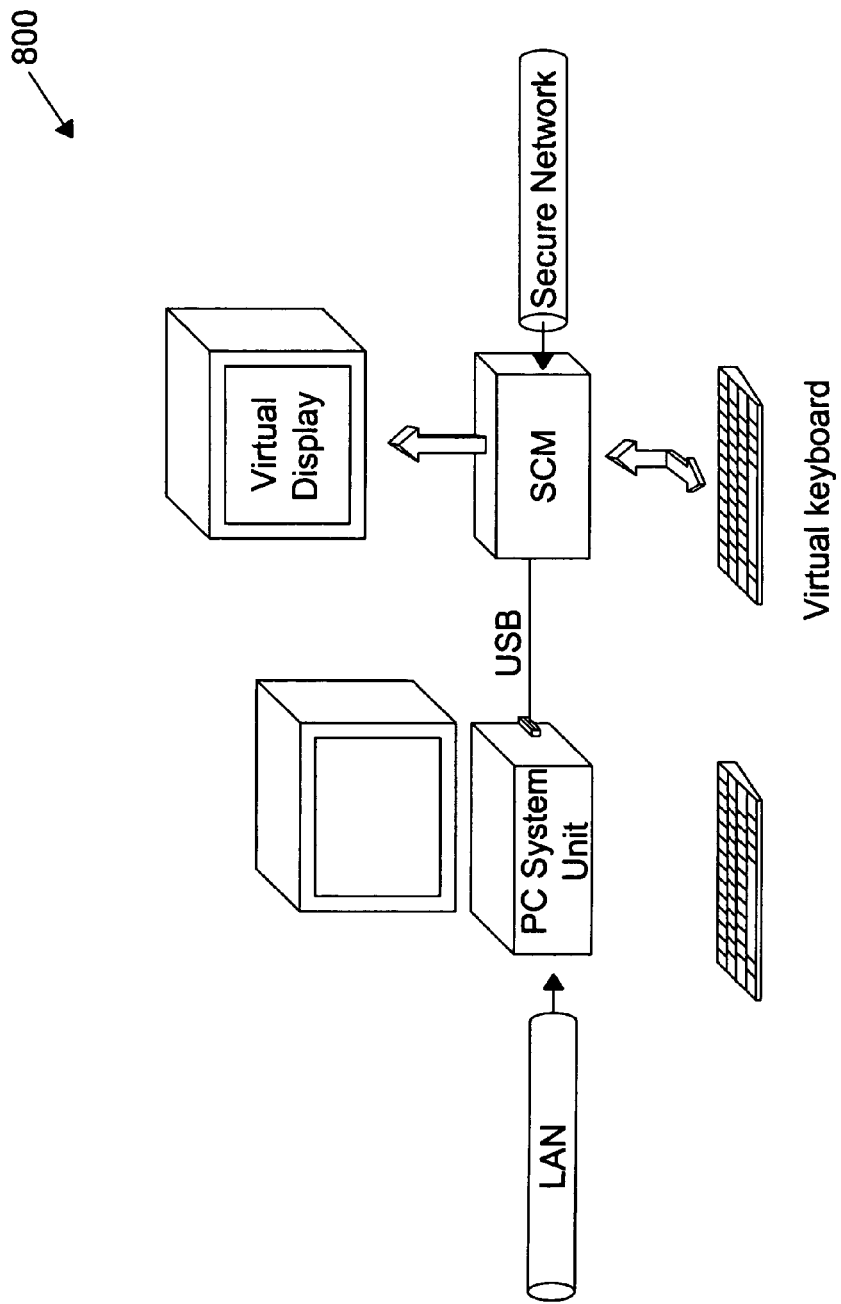
FIG. 8 illustrates a block diagram of a virtual input/output system in conjunction with the SCM in accordance with an exemplary embodiment of the present invention.

The SCM 702 may also include Scware (a Trusted Agent) 724. The Scware 724 may be exemplary software that acts as a trusted agent for the SCM 702 on the untrusted host environment. The Scware 724 may be loaded onto the untrusted host from the SCM 702 in "Plug-and-Play" fashion when the SCM 702 is added on to the untrusted host. The Scware 724 resides on the untrusted host environment while the SCM 702 is operating. The Scware 724 implemented in conjunction with the TSM 704 creates secure I/O paths 730 of input and output devices 722, 720 of the untrusted host 718. In an embodiment, the input and output devices 722, 720 of the untrusted host 718 may be utilized as a virtual input/output system 800 of the SCM as shown in FIG. 8.

The Scware 724 may implement several modes of operation including H-mode for a higher level of security and M-mode for a lower level of security compared to H-mode.

In H-mode, only I/O interfaces allowed by the Scware 724 may be implemented and no other applications may be allowed to run on the host platform. The Scware 724 manages input from an input device (e.g. keyboard) and output to an output device (e.g. display device) while the host OS is completely bypassed. As a result, the Scware 724 operates as a dedicated input/output device driver (e.g. keyboard/display driver). It is to be noted that a security critical section concept is used to implement the Scware 724 in H-mode to disable all applications but the Scware 724 on the host environment. The security critical section is an execution interval during which certain tasks and/or drivers are selectively disabled so that some security-sensitive function is protected from malware attacks. Malware is malicious software designed specifically to damage, disrupt, or snoop a system, such as a virus, worm, spyware, and the like.

When H-mode is finished, the Scware 724 zeroizes the appropriate memory regions of the host platform, including the output device's frame buffer. Then, the Scware 724 initiates rebooting of the OS on the host platform. In an alternative embodiment, when a power interrupt occurs during H-mode operation, a cold start of the host will be performed.

M-mode may provide a lower level of security but still virtualizes the host input device 722 and output device 720 for the SCM 702. In M-mode, the Scware 724 insulates critical data paths from malware attacks through use of authentication via a changing cipher, slippery data, security critical sections and the like. A changing cipher allows use of simpler and faster hardware and software compared to a fixed cipher. Slippery data includes critical data being decrypted only as needed. When decrypted, the slippery data is moved around in memory, thereby presenting a moving target to malware attacks including potential snoop attacks. A security critical section is an execution interval during which the Scware 724 selectively disables certain tasks and/or drivers so as to protect some security-sensitive function from a malware attack.

In an embodiment of the present invention, a user may be allowed to choose an option to install the Scware 724 when the SCM 702 is plugged into the host. If the option is declined by the user, the Scware 724 is not loaded and the SCM 702 enters an autonomous execution state. In the autonomous execution state, the host's only function is to provide power to the SCM 702. Alternatively, the host may not provide any functions at all if the SCM 702 provides its own power source. If Scware operation is selected, the user is prompted to shut down all applications running on the host and the Scware 724 is loaded onto the host. A successful Scware load culminates in an authentication handshake with the TSM 704. As shown in FIG. 8 a virtual keyboard and display usable for user interface with the SCM may be utilized in an alternative environment.

2.4 SCM Applications

In an advantageous aspect of the present invention, the SCM may be utilized by various untrusted host COTS platforms such as PDAs, cell phones, laptops and the like. The SCM may employ various interfaces depending on the host COTS platforms, including a Compact Flash (CF) interface for a PDA host platform and a Universal Serial Bus (USB) connection for a desktop PC platform. The SCM may be connected as a USB, CF, or Personal Computer Memory Card International Association (PCMCIA) device for a laptop host platform. Moreover, the SCM is suitable for providing secure wireless network connections when the SCM is added on wireless devices such as PDAs, cell phones, and other mobile devices.

Figure 9:
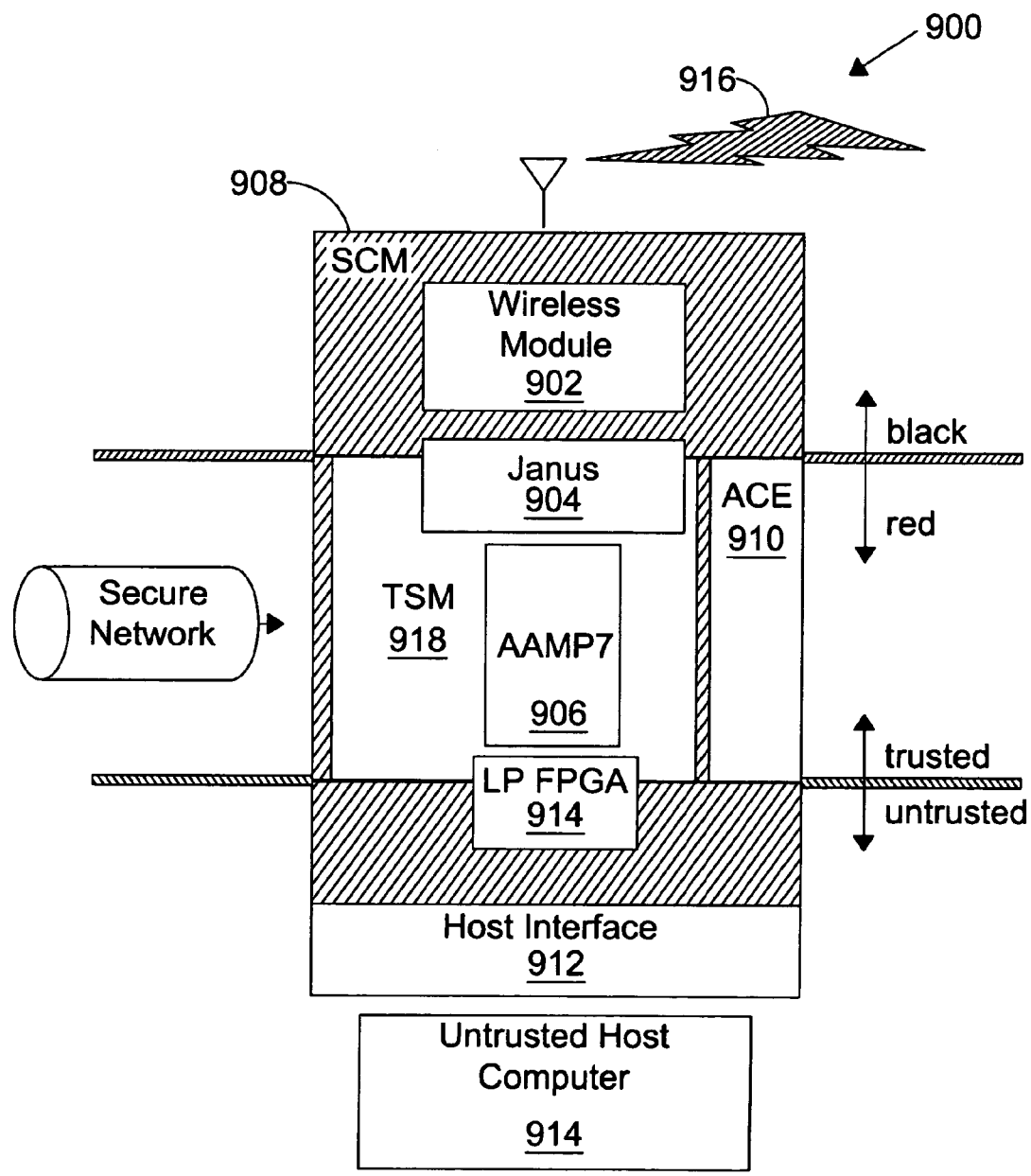
FIG. 9 illustrates a block diagram of a SCM in accordance with an exemplary embodiment of the present invention.

Referring now to FIG. 9, a block diagram of a system 900 including a SCM 908 utilized by an untrusted host platform communicating with unsecured wireless and/or wired networks (black networks) is shown. The SCM 908 may interface between a black domain and a red domain through a wireless network module 902 and the cryptographic engine 904. The SCM 908 including the TSM and the cryptographic engine resides in the red domain within a trusted environment. The wireless network module 902 may be a secure wireless module residing in the black network. For example, the wireless network module 902 may be 802.11 Wi-Fi, with data encrypted according to an NSA type 1 algorithm. A trusted processor 906 such as AAMP7 microprocessor may provide a robust security interface between red domain and wireless networks (black domain) through the cryptographic engine 904 such as Janus Crypto Engine and the secure wireless module 902. The system 900 also includes a host interface module 912 for interfacing between an untrusted host environment and a trusted environment. As described above, Interfaces between the untrusted host and the SCM 908 may be managed by a low power FPGA 914 and the trusted processor 906, allowing for any number of strict authentication protocols.

Figure 10:
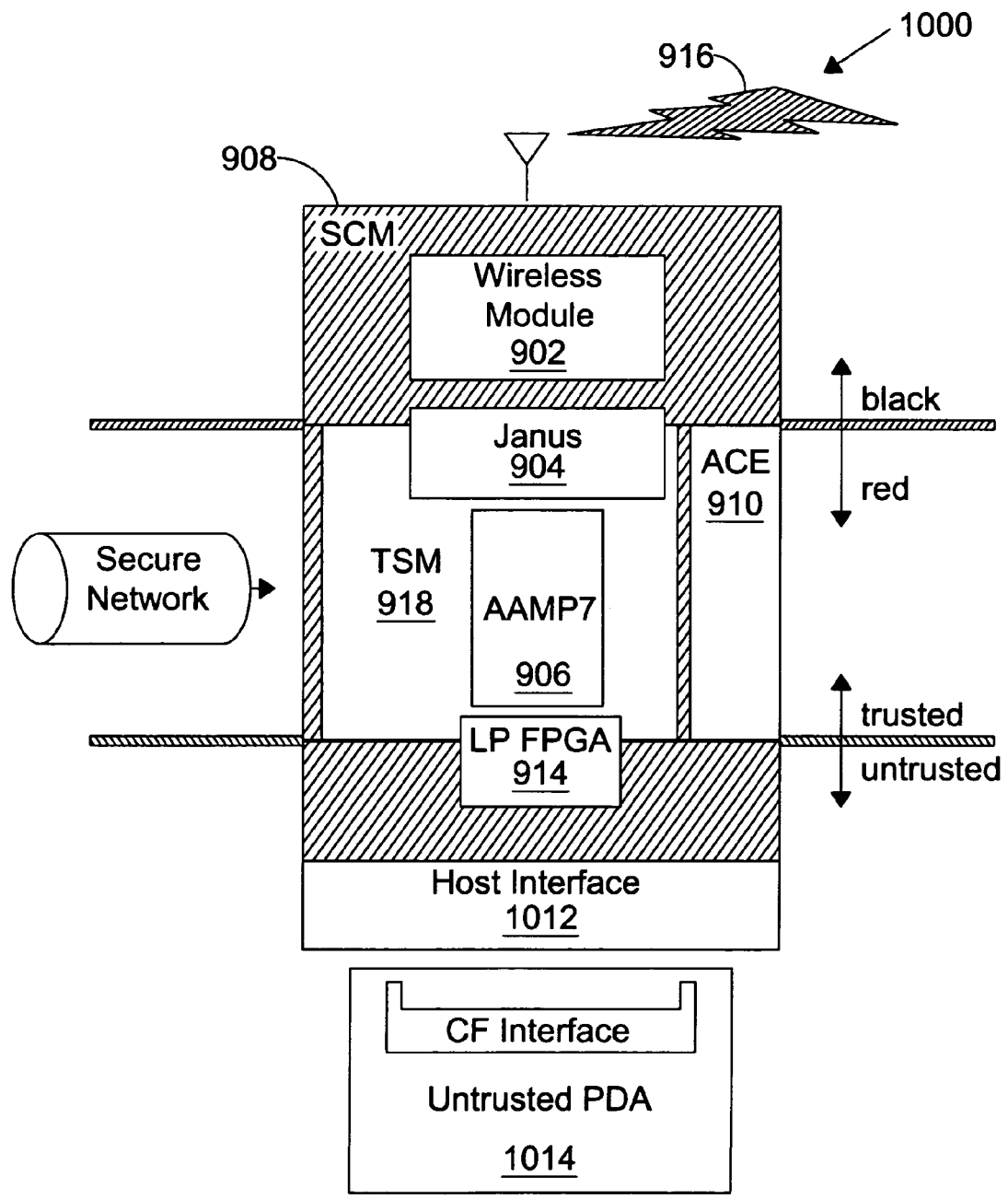
FIG. 10 illustrates a block diagram of the SCM interfacing with an untrusted PDA in accordance with an exemplary embodiment of the present invention.
Figure 11:
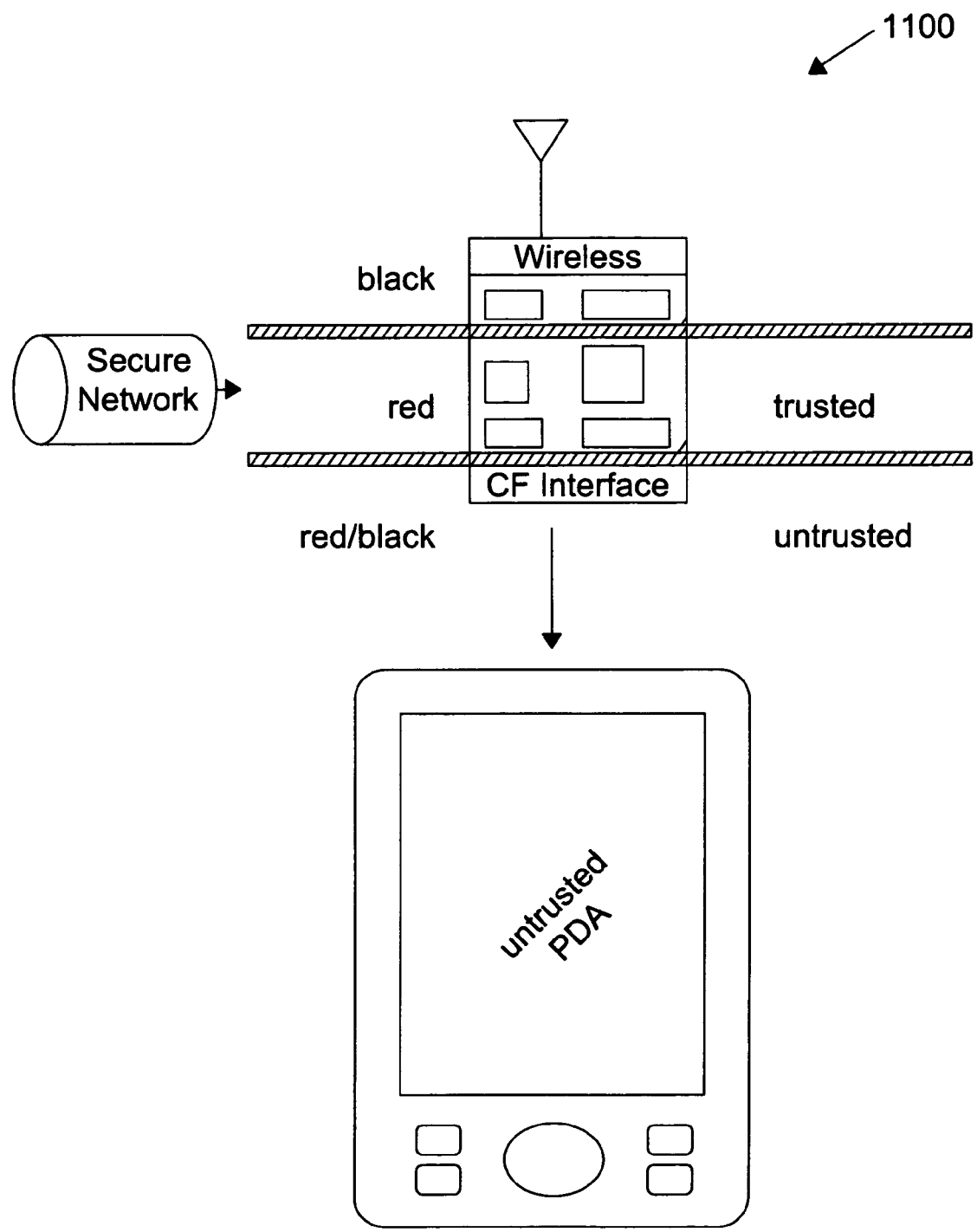
FIG. 11 illustrates a block diagram of a PDA computing environment utilizing the SCM shown in FIG. 10 in accordance with an exemplary embodiment of the present invention.

Referring now to FIG. 10, a block diagram of a system 1000 including a SCM 908 interfacing with an untrusted PDA 1014 is shown. The SCM 908 may include Compact Flash (CF) interlace 1012 for the host interface module. Untrusted application software and hardware may be implemented in the PDA 1014 while trusted applications are implemented in the SCM 908. FIG. 11 illustrates a block diagram of a PDA computing environment 1100 utilizing the SCM shown in FIG. 10.

Figure 12:
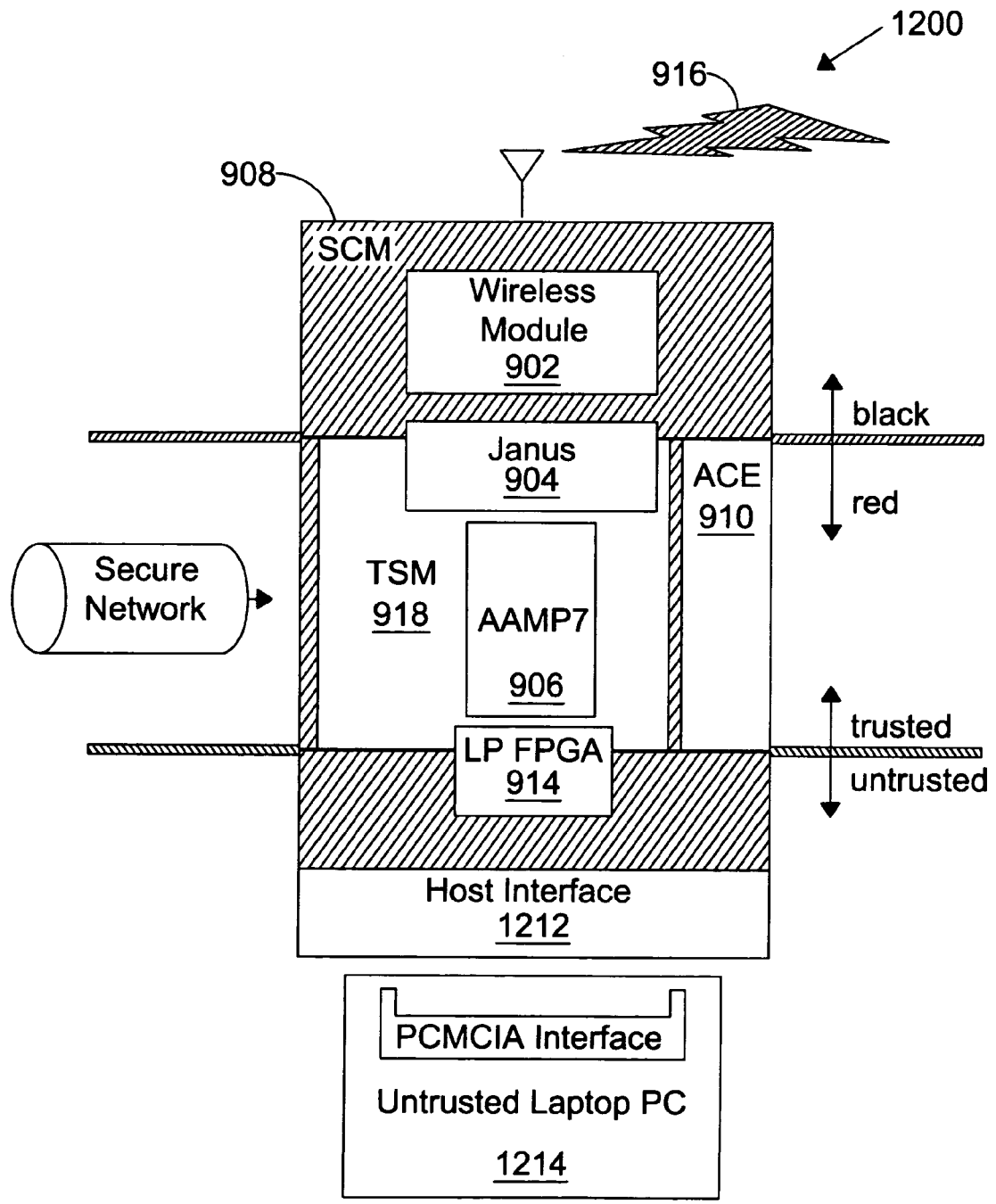
FIG. 12 illustrates a block diagram of the SCM interfacing with an untrusted Laptop PC in accordance with an exemplary embodiment of the present invention.
Figure 13:
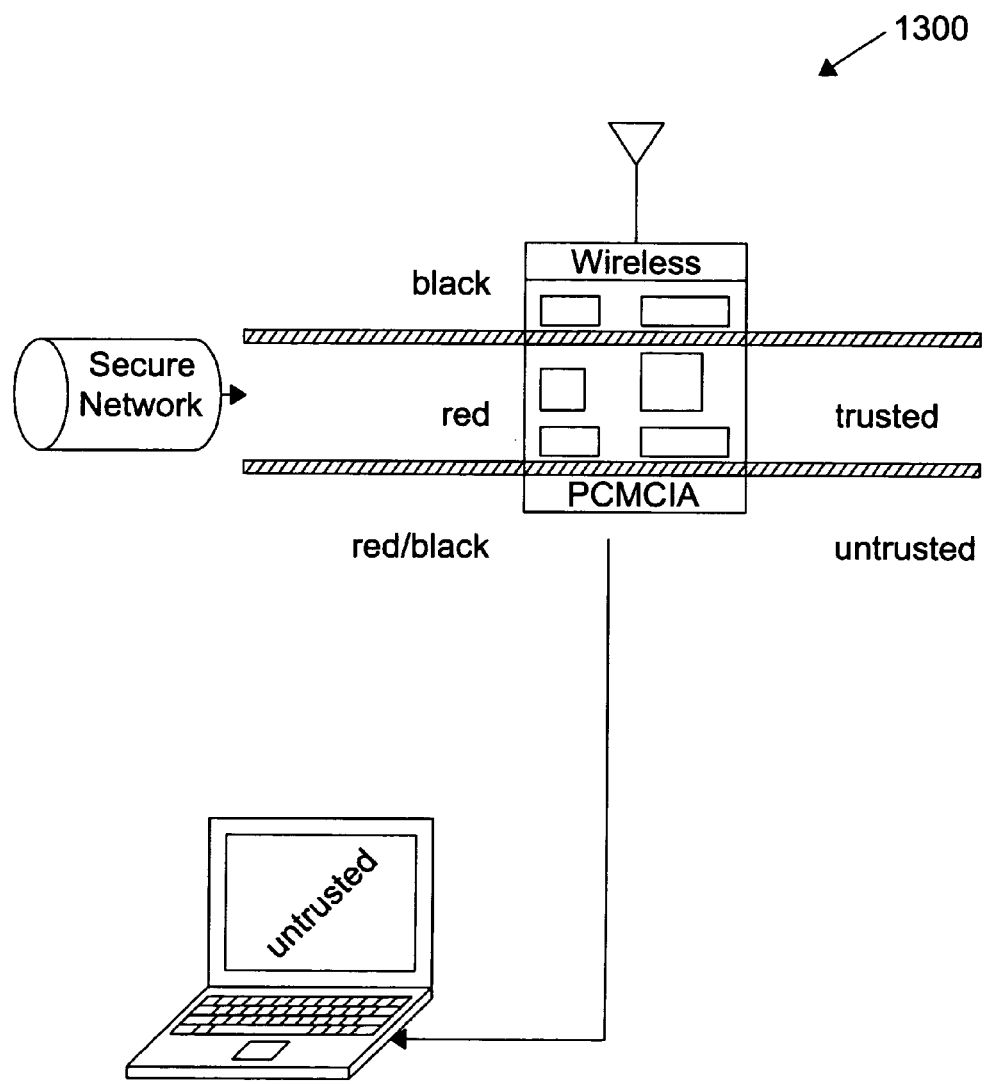
FIG. 13 illustrates a block diagram of a Laptop PC computing environment utilizing the SCM shown in FIG. 12 in accordance with an exemplary embodiment of the present invention.

Referring now to FIG. 12, a block diagram of a system 1200 including a SCM 908 interfacing with an untrusted laptop Personal Computer (PC) is shown. The SCM 908 may include a PCMCIA interface 1212 for the host interface module. FIG. 13 illustrates a block diagram of a Laptop PC computing environment 1300 utilizing the SCM shown in FIG. 12.

Figure 14:
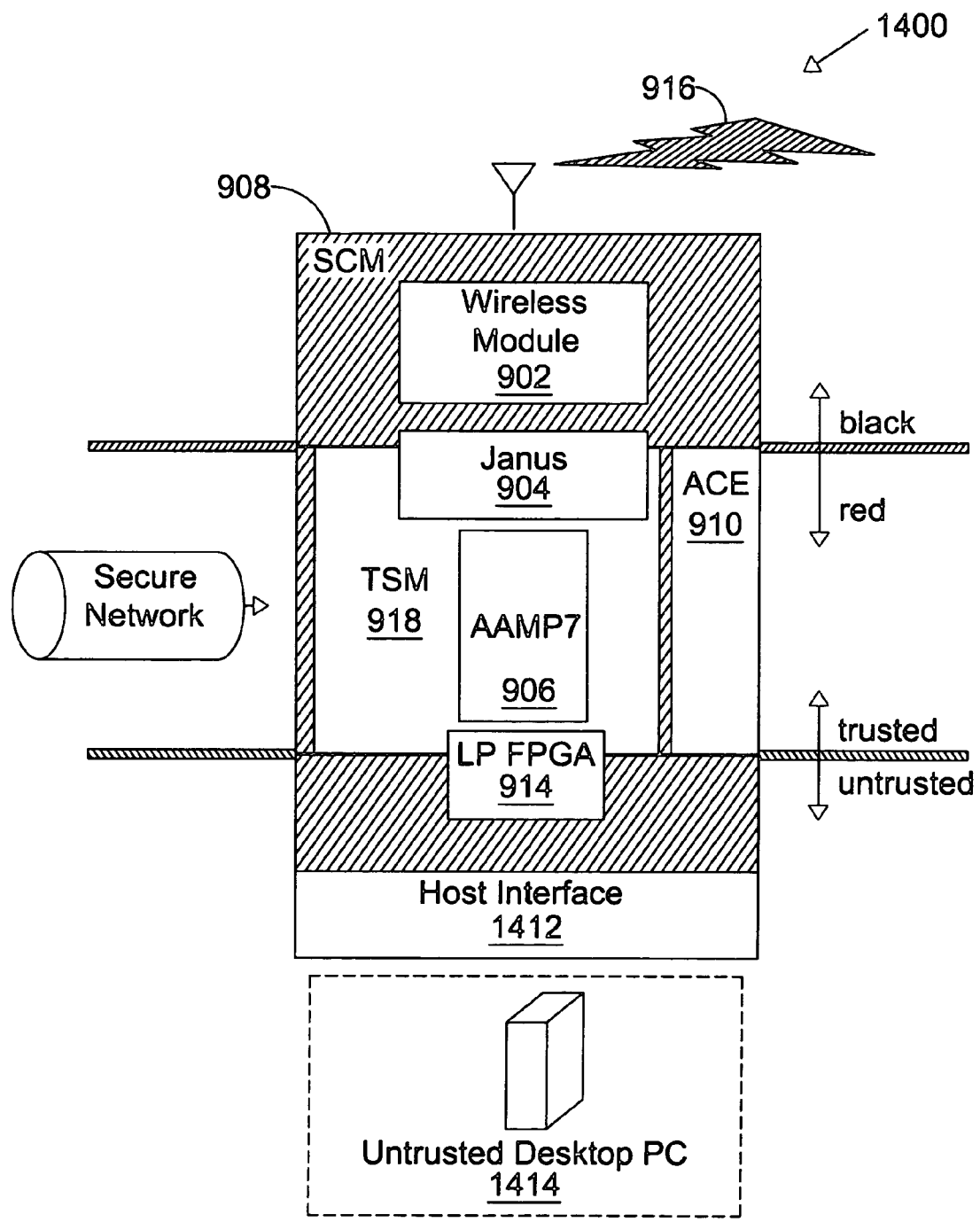
FIG. 14 illustrates a block diagram of the SCM interfacing with a desktop PC in accordance with an exemplary embodiment of the present invention.
Figure 15:
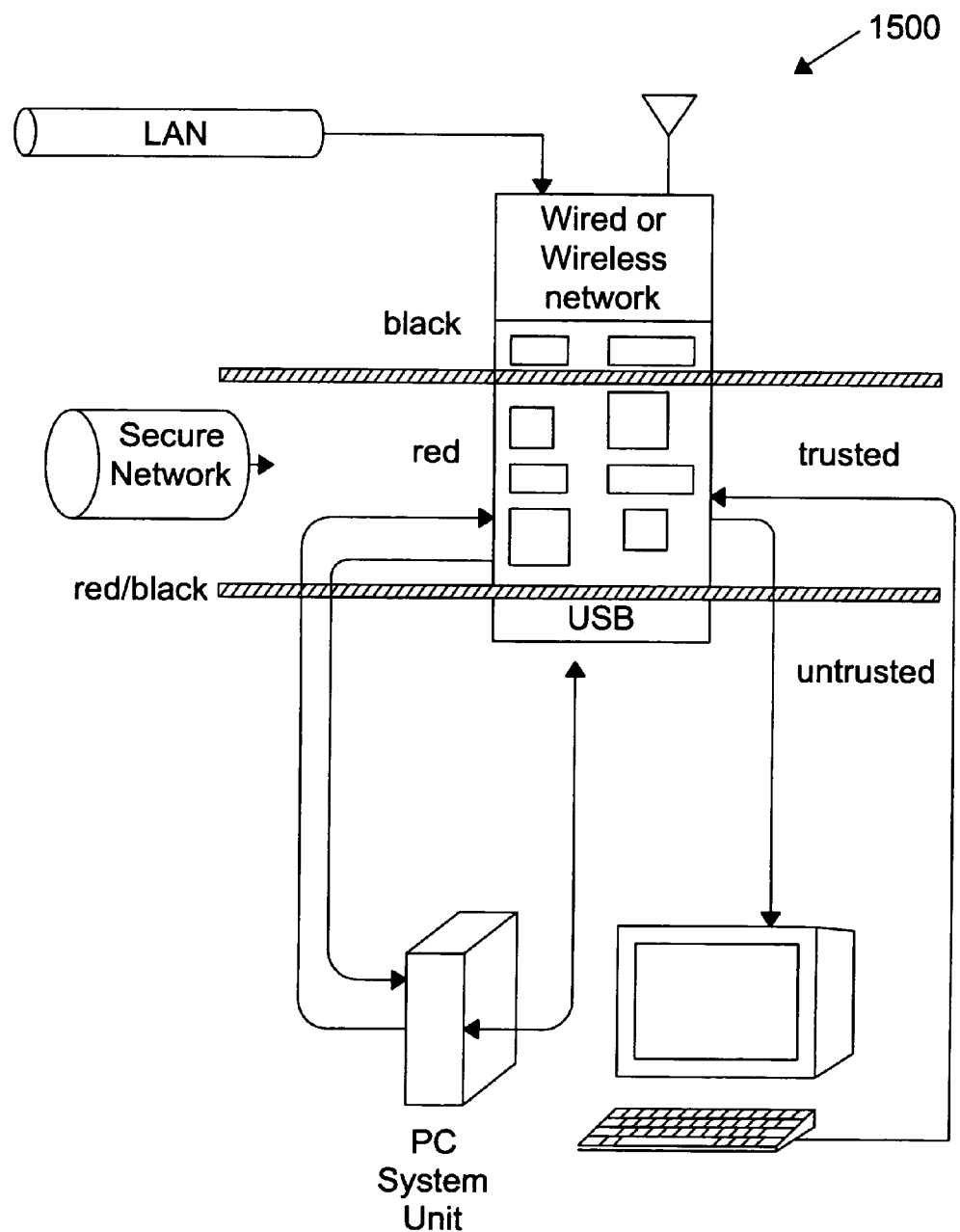
FIG. 15 illustrates a block diagram of a desktop PC computing environment utilizing the SCM shown in FIG. 14 in accordance with an exemplary embodiment of the present invention.

Referring now to FIG. 14, a block diagram of a system 1400 including a SCM 908 interfacing with a desktop PC 1414 in accordance with an exemplary embodiment of the present invention is shown. The SCM 1908 may include a USB interface 1412 for the host interface module. FIG. 15 illustrates a block diagram of a PC computing environment 1500 utilizing the SCM 908 shown in FIG. 14. In an embodiment of the invention, a secure wireless interface module for a wireless network and a secure LAN interface module for a Local area network may be utilized. Each interface module may be coupled to a crypto engine in the SCM. A keyboard and a display of the untrusted PC may be utilized for virtual I/O devices for the SCM through a trusted agent.

In an embodiment of the present invention, a conventional layered authentication approach for wireless devices may be utilized for the SCM. The conventional layered authentication approach is based on classical security theory of the three ways to identify a user: "something you have", "something you know", and "something you are" (location-based security).

"Something you know" may include a PIN or pass-phrase that is required to be entered into the SCM. The SCM may provide a special jack as an interface to an external biometric device to address "something you are". "Something you have" is typically solved using a smartcard or secure token. An ultra low power micro-fob that may be suitable for being worn (to minimize loss or theft) by a user of the SCM may be utilized. The micro-fob may be configured to transmit an authentication key at specific intervals to enable access to the SCM. The transmission may be done using near-field magnetic wireless communication. Magnetic communication provides low power, low cost, and jam-resistant advantages over traditional RF communication. The rapid roll-off of the magnetic signal at 1/r6 (versus 1/r2 for RF) provides an advantage in the case that the user has to be within close proximity to the SCM for the device to be enabled. Each micro-fob may be coded to the corresponding SCM device that it protects. If the signal is lost for a preset amount of time, the SCM device may lock out user access or start auto-zeroizing. In addition, location-based security may be added as an additional layer of security to restrict access to the SCM within a specific geographic region.

Figure 16:
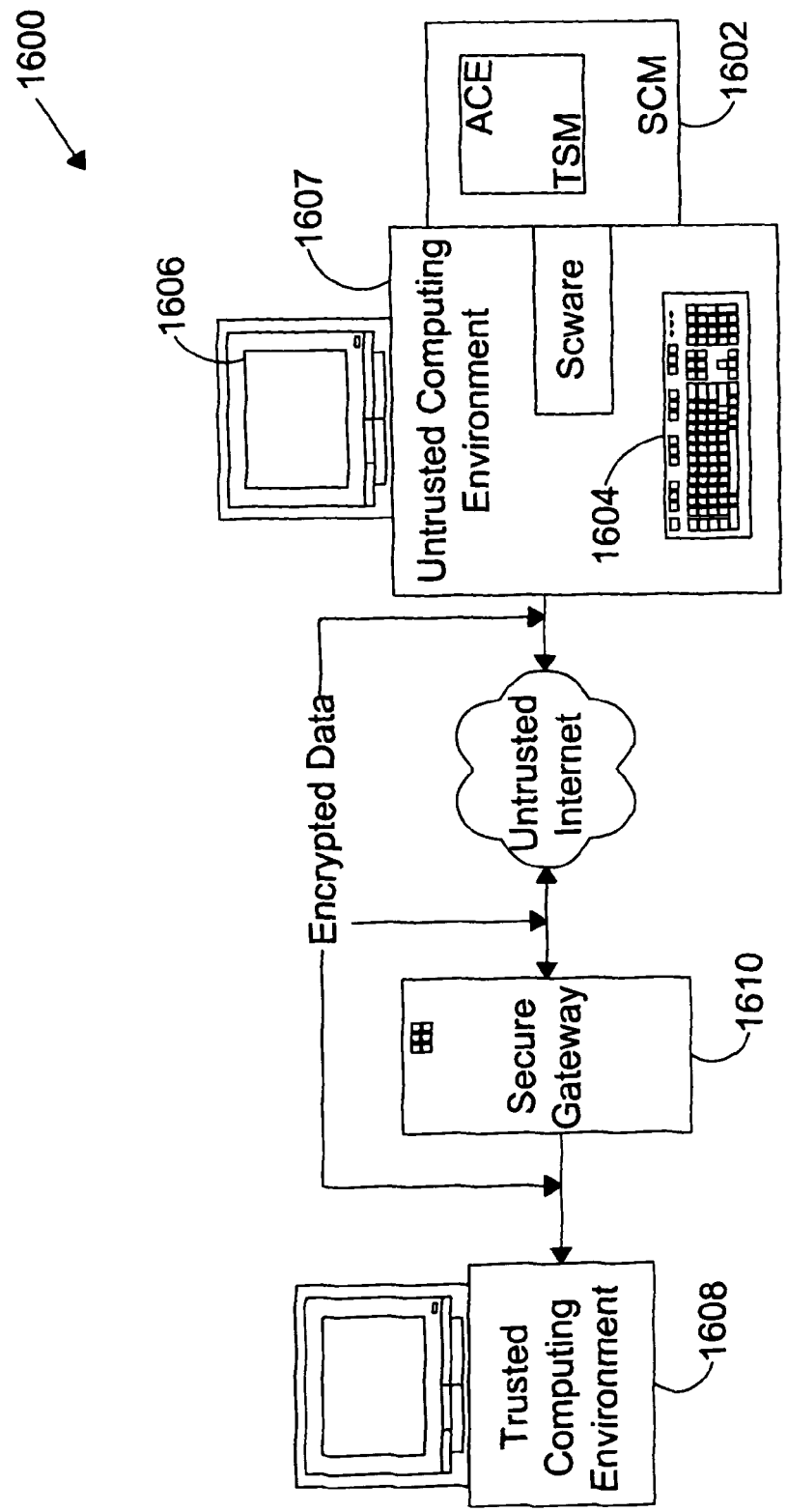
FIG. 16 illustrates a block diagram of a computing environment utilizing the SCM for a remote trusted host in accordance with an exemplary embodiment of the present invention.

Referring now to FIG. 16, a block diagram of a computing environment 1600 utilizing the SCM for a remote trusted host is shown. In an embodiment of the present invention, the SCM 1602 may be implemented to secure a keyboard 1604 and a display 1606 on an untrusted computing environment 1607 for use with an application running on a trusted remote computing environment 1608. The trusted computing environment 1608 may be accessed by the SCM 1602 via a secure network gateway 1610. Data transferred from the SCM 1602 to the trusted remote computing environment 1608 via an untrusted network may be encrypted.

2.5 Test Cases

Figure 17:
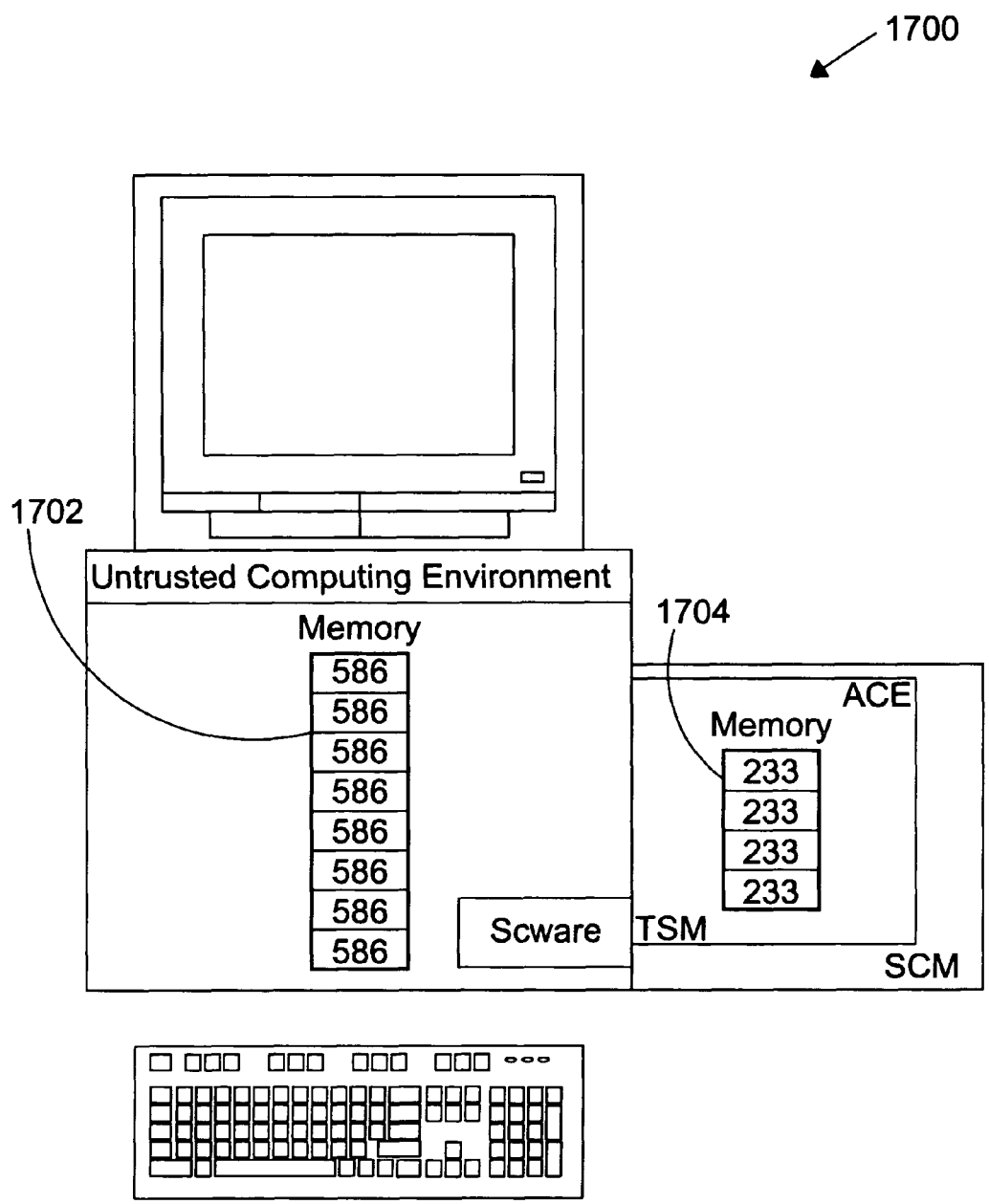
FIG. 17 illustrates memory patterns utilized to test the SCM in accordance with an exemplary embodiment of the present invention.

To validate the security protection in the SCM architecture, several test cases may be developed to simulate hacker-style attacks against the host and the SCM. The test cases may be built and executed based on the detailed design description of the SCM/host interface. In FIG. 17, memory patterns 1702, 1704 utilized by an exemplary test case attempting to access secure data are shown. The secure data 1702 may be a large array of the same number stored on unused memory of the host platform. A different number may be used for the SCM's unused memory 1704. Test cases may be executed against a given security execution regime, with an important metric being the minimum amount of time it takes to compromise data at the security level being tested. If test cases discover the number stored in the SCM's unused memory 1704 or the number stored on the unused memory 1702 of the host platform, the test cases may have performed a successful attack.

The present invention provides numerous advantages. A secure system dealing with large numbers of heterogeneous COTS platforms and their associated networks may have an inherent variability problem resulting in complicated and costly architecture of the secure system. The SCM may remove the variability problem in such a system. Moreover, use of the ACE in conjunction with the TSM may ensure the COTS applications running on the SCM to be free from malware and the manufacturer-supplied software to be trusted. Consequently, the SCM provides trusted and portable COTS computing environments against malware.

To maximize security, selected applications may be ported to the TSM and run independently of the ACE and an untrusted host. Alternatively, the SCM may replace the host platform for secure execution of COTS applications. Further, the Scware in H-mode may convert a COTS platform into a dedicated keyboard and display for the SCM, and thereby complete the untrusted-to-trusted host transformation process. In addition, the SCM may be packaged in a form factor suitable for various portable devices such as a PDA, a cell phone, a GPS device and the like. The form factor may include subcomponents such as circuit boards and the like.

Multiple combinations of embodiments of the invention have been described. It is believed that the present invention and many of its attendant advantages will be understood by the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A system for providing a trusted COTS computing environment for an untrusted host, comprising:
   a first subsystem including authenticated applications software and authenticated operating systems;
   a second subsystem for managing and controlling I/O paths to said system, wherein said second subsystem includes a processor for maintaining secure partitions for memory and I/O resources, a plurality of I/O channels, a cryptographic engine, and a secure local memory; and
   a trusted agent communicatively coupled to said second subsystem, said trusted agent providing a secure path between an input device and an output device of said untrusted host and said system, said trusted agent residing on said untrusted host,
   wherein said first subsystem is cleansed and then stored on said secure local memory.

2. The system as described in claim 1, wherein said trusted agent provides virtual input device and output devices for said first and second subsystems by utilizing said input and output devices of said untrusted host.

3. The system as described in claim 1, wherein said first subsystem and said second subsystem are coupled through a virtual I/O path.

4. The system as described in claim 1, wherein said plurality of I/O channels include an I/O channel coupled to a secured network.

5. The system as described in claim 1, wherein said plurality of I/O channels include an I/O channel coupled to said secure local memory.

6. The system as described in claim 1, wherein said second subsystem further comprises a secure network interface module.

7. The system as described in claim 1, wherein said trusted agent is loaded on said untrusted host during an initialization phase of said system.

8. The system as described in claim 7, wherein said trusted agent is loaded in a plug and play fashion.

9. The system as described in claim 7, wherein said trusted agent is configured to ensure zeroization of said untrusted host.

10. The system as described in claim 1, wherein said first subsystem is encrypted after being cleansed.

11. The system as described in claim 1, wherein said stored first subsystem is loaded with said second subsystem during an initialization phase.

12. The system as described in claim 11, wherein said first subsystem includes authenticated code and data used for a running a COTS application.

13. The system as described in claim 1, wherein said processor of said second subsystem manages an untrusted host interface through predetermined security policies.

14. The system as described in claim 1, wherein said secure local memory employs a cryptographic engine.

15. The system as described in claim 1, wherein said authenticated applications software is COTS.

16. The system as described in claim 1, wherein said authenticated operating systems are COTS.

17. A secure system, comprising:
   a secure computing module, the secure computing module including:
      a first subsystem including authenticated applications, data and code associated with said authenticated applications and authenticated operating systems, and a second subsystem for controlling each I/O path of said secure computing module, said second subsystem including:
- a trusted processor, the trusted processor configured for maintaining secure partitions for memory and I/O resources;
- a plurality of I/O channels;
- a cryptographic engine; and
- a local storage;

a host interface module communicatively coupled to the secure computing module via said second subsystem of said secure computing module, said host interface module configured for interfacing between an untrusted host environment and a trusted environment; and a secure wireless module, said processor of said second subsystem providing a secured wireless interface through said cryptographic engine and said secure wireless module, said host interface module residing on said untrusted environment and said first subsystem and said second subsystem residing on a trusted environment, said first subsystem being cleansed and stored on the local storage.

18. The secure system as described in claim 17, wherein said first subsystem and said second subsystem are communicatively coupled though virtual I/O paths.

19. The secure system as described in claim 17, wherein said operating systems are embedded COTS operating systems.

20. The secure system as described in claim 17, wherein said secure computing module allows only authenticated applications to run on said trusted environment.

21. The secure system as described in claim 17, wherein said first subsystem is cleansed and then stored on said local storage.

22. The secure system as described in claim 21, wherein said first subsystem is encrypted after being cleansed.

23. The secure system as described in claim 21, wherein said stored first subsystem on said local storage is loaded during an initialization phase of said secure computing module.

24. The secure system as described in claim 22, wherein said first subsystem is decrypted and loaded during an initialization phase of said secure computing module.

25. The secure system as described in claim 17, wherein said second subsystem further includes a Field-Programmable Gate Array coupled to said host interface module.

26. The secure system as described in claim 17, wherein said host interface module includes a Compact Flash interface module.

27. The secure system as described in claim 17, wherein said host interface module includes a Universal Serial Bus interface module.

28. The secure system as described in claim 17, wherein said Secure Computing Module is an add-on module to an untrusted host platform in said untrusted host environment.

29. The secure system as described in claim 17, wherein said host interface module includes a PCMCIA module.

30. The secure system as described in claim 17, wherein said secure computing module is suitable for being packaged in a form factor suitable for portable devices.

31. The secure system as described in claim 30, wherein said portable devices includes a PDA device.

32. A secure system, comprising:
- means for providing an authenticated subsystem, said authenticated subsystem including applications, data and code associated with said applications, and embedded operating systems;
- means for controlling each I/O path of said secure system, said controlling means including: means for maintaining secure partitions for memory and I/O resources; means for encrypting and decrypting information; and means for storing said authenticated subsystem and said encrypted information;
- means for creating a secure I/O path for untrusted host input and output devices;
- means for interfacing between an untrusted host platform and said secured system, wherein said means for creating a secure I/O path is located on said untrusted host platform,
- wherein said authenticated subsystem is cleansed and then stored on said storing means.

33. The secure system as described in claim 32, wherein said authenticated subsystem is encrypted after being cleansed.

34. The secure system as described in claim 33, wherein said stored authenticated subsystem is decrypted and loaded during an initialization phase.

35. The secure system as described in claim 32, wherein said creating a secure I/O path means utilizes input and output devices of said untrusted host platform to provide virtual input and output devices for said secure system.

36. The secure system as described in claim 32, wherein each I/O path of said secure system is configured to go through said controlling I/O means.

37. The secure system as described in claim 32, wherein said creating a secure I/O means ensures zeroization of said untrusted host.

38. The secure system as described in claim 32, wherein said creating a secure I/O means includes software acting as a trusted agent for said secure system.

* * * * *